(12) United States Patent
Lüchinger et al.

(10) Patent No.: US 6,686,545 B2
(45) Date of Patent: Feb. 3, 2004

(54) BALANCE WITH A WEIGHING COMPARTMENT

(75) Inventors: Paul Lüchinger, Uster (CH); Eduard Fringeli, Bubikon (CH); Beat Meister, Wolfhausen (CH)

(73) Assignee: Mettler-Toledo GmbH, Greifensee (CH)

( * ) Notice: Subject to any disclaimer, the term of this patent is extended or adjusted under 35 U.S.C. 154(b) by 124 days.

(21) Appl. No.: 09/957,933

(22) Filed: Sep. 21, 2001

(65) Prior Publication Data

US 2002/0040814 A1 Apr. 11, 2002

(30) Foreign Application Priority Data

Oct. 4, 2000 (CH) ..................................... 2000 1958/00

(51) Int. Cl.[7] .............................................. G01G 21/28
(52) U.S. Cl. ....................... 177/180; 177/126; 177/238; 177/181
(58) Field of Search ................................ 177/180, 181, 177/182, 238, 239, 240, 241, 242, 243, 244, 126, 127

(56) References Cited

U.S. PATENT DOCUMENTS 4,921,058 A * 5/1990 Pally et al. .................. 177/181
5,583,322 A * 12/1996 Leisinger et al. ........... 177/180
6,566,614 B1 * 5/2003 Flückiger et al. ........... 177/180

FOREIGN PATENT DOCUMENTS

| DE | 9407984 | 9/1994 |
|----|---------|--------|
| EP | 0234008 | 9/1987 |
| EP | 0574668 | 12/1993 |
| GB | 2246446 | 1/1992 |

* cited by examiner

Primary Examiner—Randy Gibson
(74) Attorney, Agent, or Firm—Friedrich Kueffner

(57) ABSTRACT

A balance (1) has a weighing compartment (4) that borders on a stationary part (8, 9) of the balance and is otherwise enclosed by at least one side wall panel (5, 6), a front wall panel (7), and a top cover panel (12). At least one of the side wall and top cover panels is slidable by means of a guiding device (17, 120) to open and close the weighing compartment (4). A holder arrangement (15, 17c, 58, 125) for the at least one slidable panel (5, 6, 12) is integrated in the guiding device (17, 120), and a holder arrangement for a non-slidable panel is integrated in the stationary part (8). The holder arrangements (15, 19, 17c, 58, 125) releasably connect the panels (5, 6, 7, 12) to the balance by means of form-locking closure devices, so that each panel (5, 6, 7, 12) can be attached to the balance as well as released for removal from the balance by applying a force to the panel (5, 6, 7, 12) and/or the holder arrangement (15, 19, 17c, 58, 125).

34 Claims, 12 Drawing Sheets

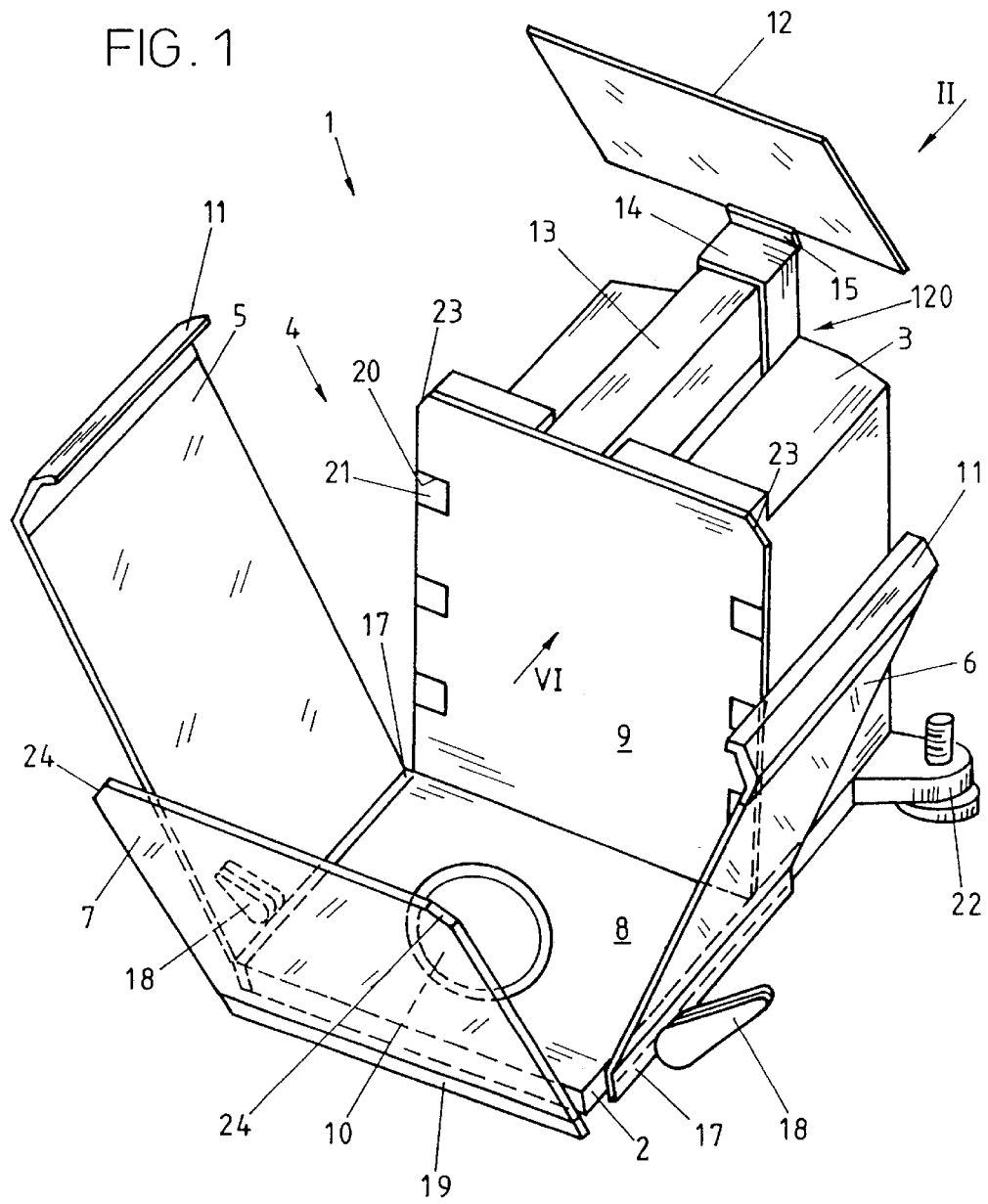

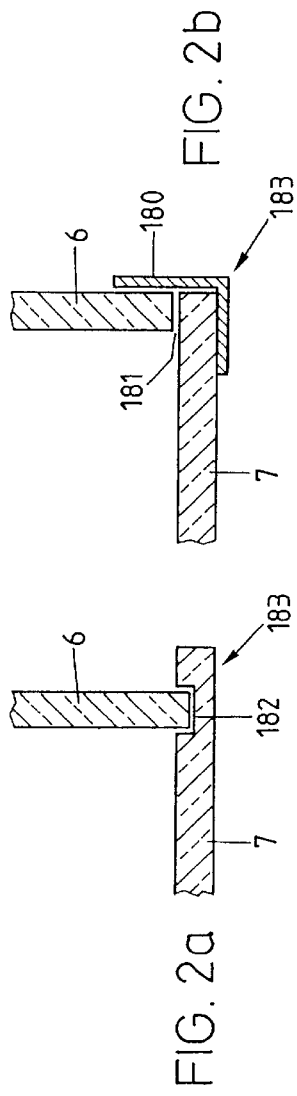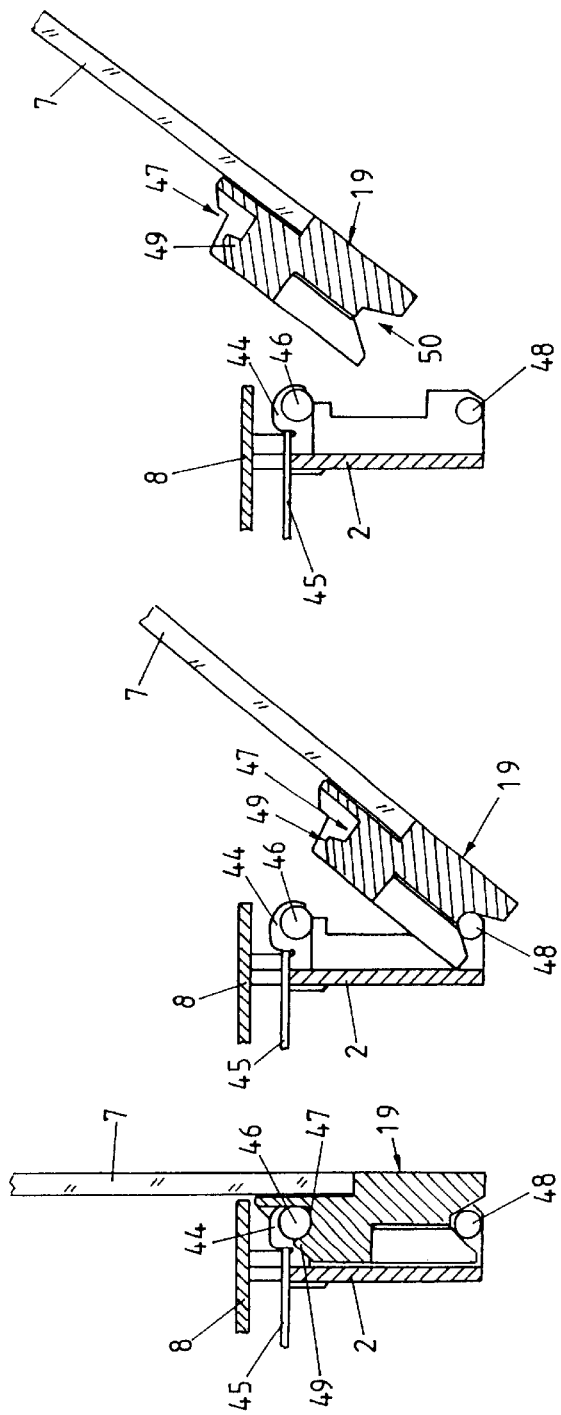

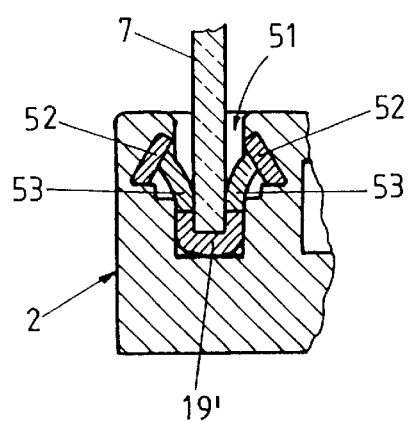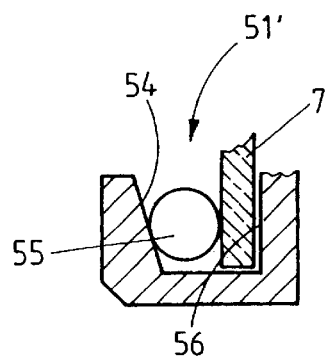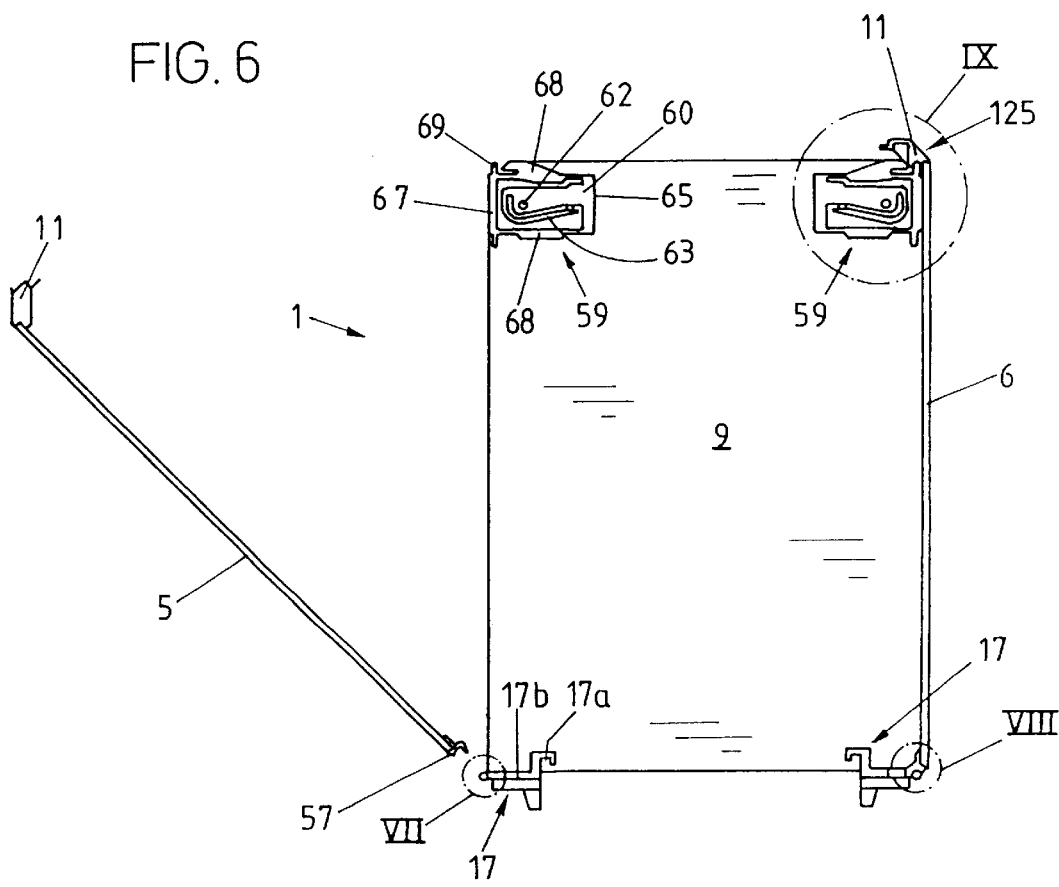

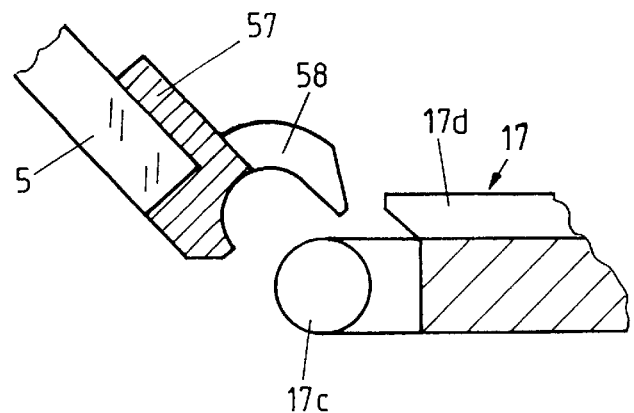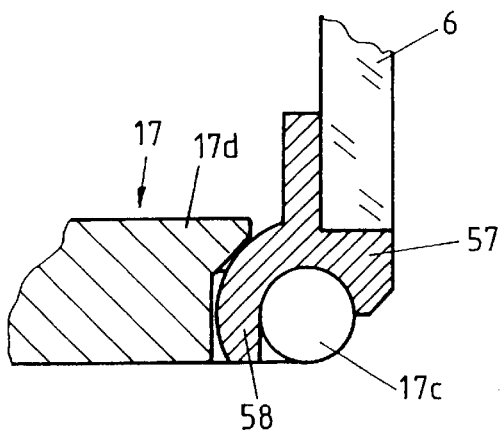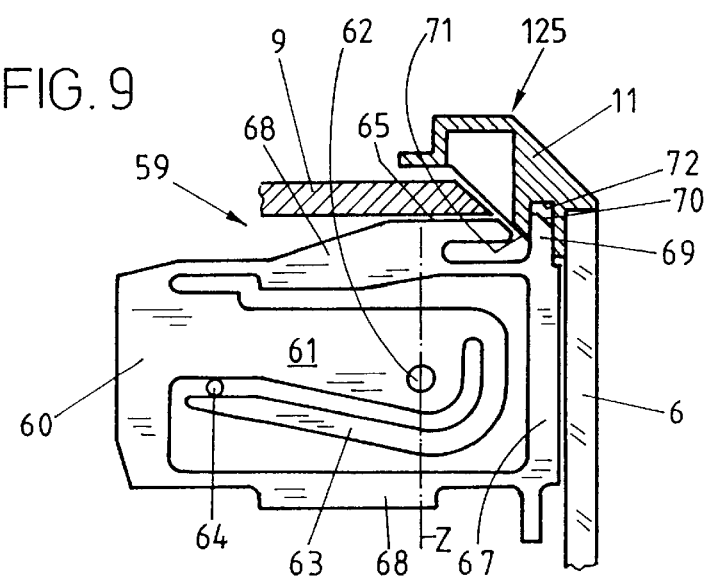

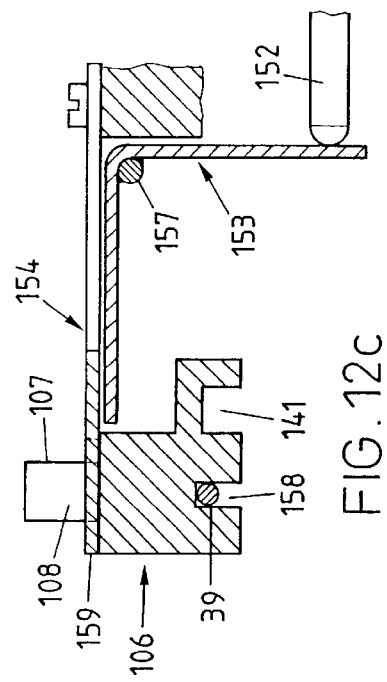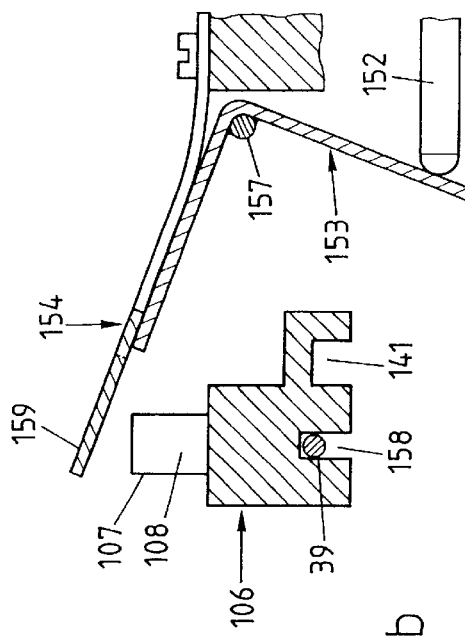
FIG. 12a
FIG. 12b
FIG. 12c
FIG. 12d

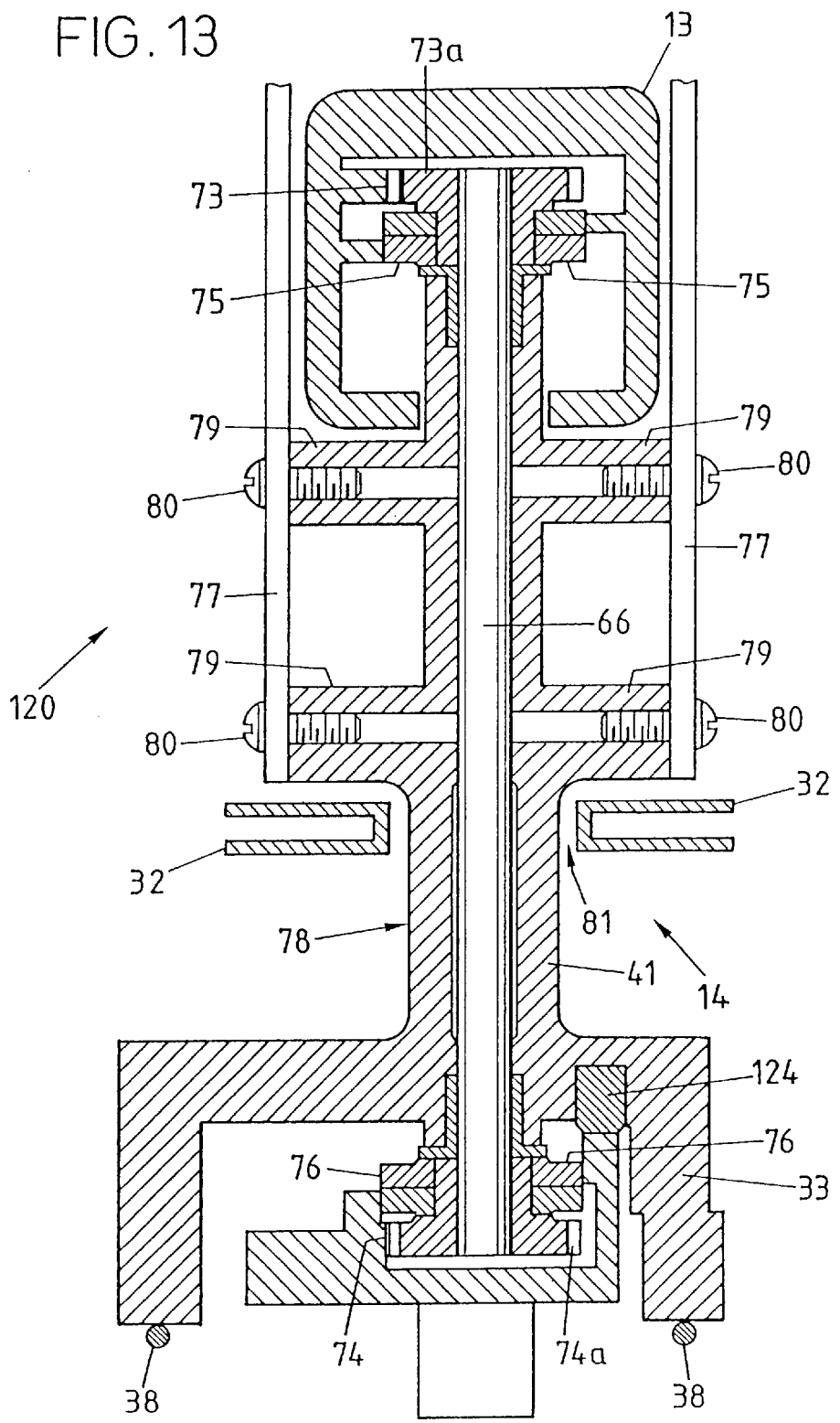

BALANCE WITH A WEIGHING COMPARTMENT

BACKGROUND OF THE INVENTION

The present invention relates to a balance with a weighing compartment that borders on a stationary part of the balance and is otherwise enclosed by at least one side wall, a front wall, and a top cover panel, where at least one of the walls and/or the top cover panel is slidable by means of a guiding device to open and close the weighing compartment.

A known balance of this kind, as described for example in the European patent application EP-A-0 234 008, has a weighing pan and a weighing compartment that encloses the weighing pan on all sides, with a stationary front glass wall, rearward-sliding side walls, a rearward-sliding top cover panel, and a connector that joins the side walls with the top cover panel. The connector is configured so that when a side wall and/or the top cover panel is opened or closed, the connector moves together with the side wall and/or the top cover panel, so that the weighing compartment is freely accessible without being obstructed by frame members on the sides. Furthermore, the side walls can be opened and closed individually or together, with or without moving the top cover panel at the same time. The movement can be motorized or manual. With manual operation, the walls that are to be moved are uncoupled from the motorized drive mechanism.

The European patent application EP-A-0 574 668 discloses a balance that has a draft-protection housing with a top cover panel that can be attached or taken off by means of a manually operated locking arrangement. After the top cover panel has been taken off, the front wall as well as the side walls can be completely removed from the housing for cleaning. In this known design of a balance, the top cover panel is part of a frame that holds the draft-protection housing together. To a certain extent, the walls are unobstructed by the frame members so that the operator has a better view of the interior of the housing, but for some applications, this design is still not entirely satisfactory. One drawback is that the upper part of the frame is still a required element, and another concern is that the locking elements, which have to be manufactured with high precision, require a certain amount of manipulation in order to align them with the recesses in which they are received.

In state-of-the-art balances, if conduits, hoses, or other connections have to be introduced into the weighing compartment in a flexible, non-permanent arrangement, a slidable side wall or the top cover panel has to stay at least partially open during the weighing process, because the rigid frames and complicated guiding devices do not allow the walls to be provided with individual, easily accessible conduit passages. However, leaving a wall open can cause errors in the weighing result.

In essence, known balances suffer from the drawback that they don't simultaneously allow free, unrestricted access to the weighing compartment as well as an unobstructed view of the weighing pan. Simultaneous access from the side and from above is not possible, a problem that applies in particular to the accessibility for conduits, hoses or other connections. In addition, the weighing compartment is difficult to clean.

OBJECT OF THE INVENTION

It is therefore the object of the present invention, to provide a balance with a weighing compartment that simultaneously offers an unobstructed view of the weighing pan and good accessibility in all situations, and to accomplish this objective through a simple concept that also makes the manipulation easy for the user. The weighing compartment should be conveniently accessible for placing a sample on the pan when the walls are open, and it should allow the passage of conduits and cables with the wall completely closed. In addition, it should be easy to clean, without the need for complex manipulations.

SUMMARY OF THE INVENTION

The present invention offers a solution to the afore-described problem in a balance with a weighing compartment that borders in part on a stationary part of the balance and is otherwise enclosed by at least one side wall panel, a front wall panel, and a top cover panel panel, where at least one of the walls and/or the top cover panel is slidable by means of a guiding device to open and close the weighing compartment. According to the invention, a holder arrangement for the at least one slidable wall panel is integrated in the guiding device, and a holder arrangement for each of the non-slidable wall panels is integrated in the stationary part of the balance. Each wall panel is releasably held in position by its respective holder, which can be locked and unlocked by engaging and disengaging a form-locking closure device that is operated simply by applying a force to the wall panel and/or the holder arrangement.

The side walls, the front wall, and the top cover panel can be individually separated by hand from the balance by simply pulling at them lightly to tilt them outwards, e.g., for easy cleaning of the wall plates, which are normally made of glass. When they are in their working position, the walls are positively locked into place. The same hand movement is used to unlock each of the walls. Besides making the weighing compartment easy to disassemble for cleaning, the concept of integrating the holder arrangements of the slidable walls in the guiding devices also accomplishes the objective of making the weighing compartment freely accessible and of allowing an unobstructed view of the weighing pan even when the weighing compartment is closed, with no sight-blocking frame members being in the way.

It is advantageous if at least one of the holder arrangements contains a snap-closure body for an automatic snap connection of the respective wall panel. Preferably, the snap-closure body is attached to the rear wall of the weighing compartment and designed as a holder and guide for the side walls.

The concept of at least one snap-closure body to hold, e.g., the side walls in their operating position is particularly favorable for a design without frame members. The kind of support frame that is required with prior-art designs is not necessary in balances according to the present invention. A snap-closure body can be manually operable, so that a wall can be attached or released by, respectively, pushing or pulling at the wall. A snap-closure body is designed so that a larger amount of force is required to pull off a wall panel than to snap it into place, so that the wall panel is held in place very securely. The special shape of the snap-closure bodies and their design as a single-piece plastic article make them particularly cost-effective to produce.

To keep out air drafts that could enter at the joints between the walls of the weighing compartment, a further embodiment of the inventive balance has edge joints where the edge of one wall is seated in a groove of the other, or one wall has an edge-cover strip to close off a gap that could form at the joint between the two walls.

A preferred embodiment of the balance has a means for driving the movement of the at least one slidable wall panel. Preferably, the drive means are designed as cord-pulley drives.

The slidable walls are releasably attached to guiding devices with couplers or clutches by which the guiding device for each individual wall panel can be connected to or disconnected from the drive means. The couplers are provided with levers so that they can be operated by hand. As a result, the side wall panels and/or the top-cover panel can be driven either individually or together or in any desired sub-combination. For example, it is possible to open and close only one side wall, or only the top cover panel. Advantageously, the coupler arrangement includes traveling coupler elements that automatically seek and find the position for engagement. For example, if a side wall is uncoupled from the drive, pushing the coupler actuator on the side wall will cause the latter to be coupled to the drive as soon as the traveling coupler element of that side wall has reached its counterpart on the wall panel.

In an advantageous embodiment of the invention, the drive means are powered by only one motor.

According to a further embodiment of the invention, the travel distance between the open and closed positions can be different for the side walls than for the top cover panel, in which case the movements of the respective drive means can be synchronized by using different transmission ratios corresponding to the different travel distances. Thus, the same motor can be used to drive the side walls and the top-cover panel.

The balance is preferably equipped with a carrying handle. Thus, the balance can, e.g., be lifted from the table with one hand, while cleaning the table surface underneath the balance with the other hand. As a special feature of the invention, the carrying handle serves at the same time as a guide rail for the guide element of the top-cover panel, with a guiding device being arranged on the handle. In an advantageous embodiment, the guiding device has at least one gear rack in an upper area of the guiding device and a parallel gear rack in a lower area. A vertical body of the guide element contains a pair of identical gears fixed on a vertical axle and rolling along the gear racks, whereby the guide element is held in alignment and prevented from jamming as it moves back and forth. This vertical arrangement of the guide element has the advantage that it minimizes the length of the guiding device for the top cover panel.

In a particularly preferred embodiment of the balance according to the invention, passage openings are provided in the side walls, the front wall, the top cover panel, and/or the rear wall of the weighing compartment for conduits and cables. The passage openings can be closed off against air drafts by means of clip-on covers. This concept has a multitude of possible applications where experiments are conducted inside the weighing compartment and weight changes are observed as part of the experiment, for example when reagents are dispensed into a beaker on the balance pan, or when a chemical reaction is being studied. A design without frame members along the edges and the possibility of tilting the walls outwards without removing them from the balance provides a simple way of running electrical supply and signal cables or conduits for fluids and gases through the cutout passages, to secure the cables and conduits in the cutout openings, and to seal the latter against air drafts by means of special clip-on holders. Special configurations of the clip-on devices, e.g., as holder elements, expand the range of their possible uses.

A special embodiment of the balance according to the invention has an accessory unit arranged, e.g., at the rear of the balance. The accessory unit contains power supplies and/or control units. Cables connected to this accessory unit through openings can be routed to the cutout passages through special guide channels along the housing, so that they will not interfere with the movement of the side walls.

BRIEF DESCRIPTION OF THE DRAWINGS

Further details of the invention may be learned from the following description of embodiments that are illustrated in the drawings, wherein FIG. 1 represents a perspective frontal view of a balance according to the invention;

FIGS. 2a and 2b represent sectional views of an edge portion of the weighing compartment in an area where two walls meet;

FIGS. 3a to 3c represent sectional views of the attachment of the front wall of the weighing compartment in three different positions;

FIG. 4 illustrates a first alternative of the wall attachment in a sectional view;

FIG. 5 illustrates a second alternative of the wall attachment in a sectional view;

FIG. 6 shows the weighing compartment as seen from a direction according to the arrow VI of FIG. 1;

FIG. 7 illustrates the detail VII of FIG. 6;

FIG. 8 illustrates the detail VIII of FIG. 6;

FIG. 9 illustrates the detail IX of FIG. 6;

FIGS. 12a to 12d illustrate a coupler device for the side walls in different views;

FIG. 13 represents a sectional view of the guiding mechanism and the drive mechanism of the top cover panel;

DETAILED DESCRIPTION OF PREFERRED EMBODIMENTS

Figure 10:
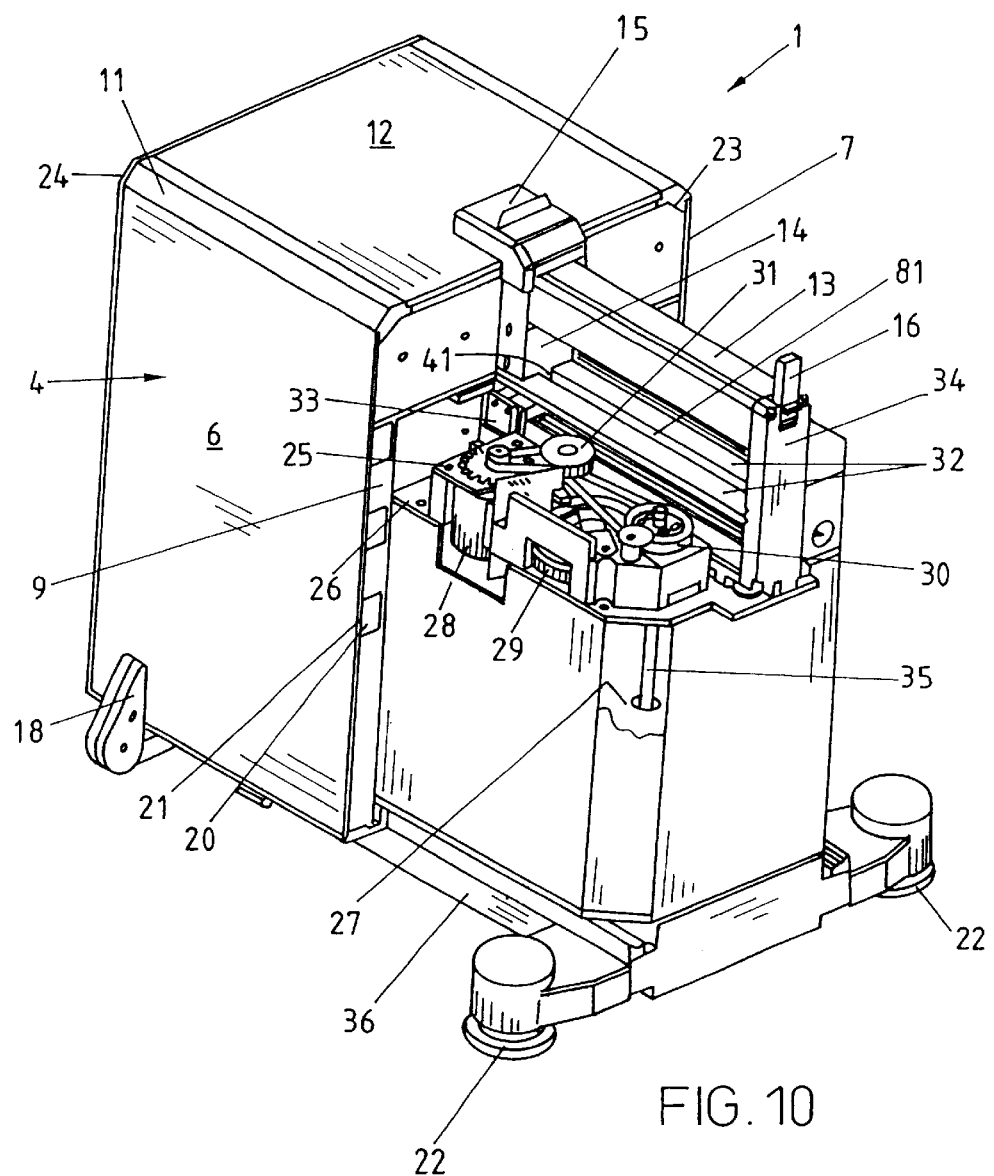
FIG. 10 shows a balance in perspective as seen in the direction of the arrow II of FIG. 1, but with the housing removed.

A balance according to FIG. 1 has a stationary part with a floor compartment 2 that contains a portion of the working system of the balance, a housing 3 that essentially contains the drive mechanism, and a weighing compartment 4. The rear wall 9 and the floor 8 of the weighing compartment 4 are formed by the stationary part. The weighing compartment 4, which serves as a draft shield, is further enclosed by the side walls 5, 6, the front wall 7, and the top cover panel 12. The floor 8 has a pass-through opening for the carrier of the weighing pan 10. However, the weighing pan can also be supported by an L-shaped cantilever arm that is attached to a coupling arrangement that passes through the rear wall of the weighing compartment, as described in the parallel patent application CH-1957/00. The different designs of the weighing pan and/or the features of the weighing compartment described in the reference just mentioned are likewise applicable to the balance described herein.

Preferably, the balance 1 stands on three feet 22.

The side walls 5, 6, the front wall 7, and the top cover panel 12 consist of a transparent material, preferably glass. It is also possible to use tempered glass, especially to make the balance safer for applications in rough environments or to make the walls less delicate to handle, so that they can, e.g., be washed in a machine.

The side walls 5, 6 and the top cover panel 12 are slidable by means of a drive mechanism, e.g., a pull-cord drive, to open and close the weighing compartment. Each of the side walls 5, 6 and the top cover panel 12 are releasably attached to a guiding device 17, 120 by means of holders that are integrated in the guiding devices 17, 120. The front wall 7 is likewise releasably attached with a holder element 19.

By tilting them slightly, the side walls 5, 6, the front wall 7, and the top cover panel 12 can easily be removed from their holders for cleaning.

In their opened position, the side walls 5, 6 as well as the top cover panel surround the housing 3. This is possible, because the housing 3 is dimensioned smaller in width and height than the weighing compartment 4.

The guiding devices 17, 120 of the side walls 5, 6 as well as of the top cover panel 12 have coupling elements (not shown in FIG. 1) by which the side walls 5, 6 and the top cover panel 12 are connected to the pull cords of a drive mechanism. Each of the side walls 5, 6 has a separate actuator handle 18 for the coupling element, as does the top cover panel 12 (not shown in FIG. 1). The function of the couplings and the drive mechanism are described below. This makes it possible to open and close the side walls 5, 6 and the top cover panel 12 either individually or in any combination of two, or all at the same time.

The balance 1 is equipped with a carrying handle 13 at the top of the housing 3. In addition to its carrying function, the handle 13 also serves as a guide track for opening and closing the top cover panel 12. A guide element 14 of the guiding device 120 runs along the guide track. The top cover panel 12 is attached to the guide element 14 through the holder 15. As described above, the holder 15 of the top cover panel 12 is configured in such a way that the top cover panel 12 can be taken off, e.g. for cleaning, by a simple tilting movement.

The top edges of the side walls 5, 6 are framed by inward-slanted border pieces 11 that hold the top edges in place through snap-closure elements ((not shown in FIG. 1, see FIG. 6) and rest against the slanted corner sections 23, 24 of the rear wall 9 and the front wall 7, respectively. The angled portions of the border pieces can overlap differently shaped top edges of the side walls 5, 6 and also of the top cover panel 12 in such a manner that they form a kind of baffle seal against the outside air, so as to block air drafts even more effectively from entering the weighing compartment 4 than do common types of draft shields. As a further advantageous feature, the border pieces 11 can be made of a transparent material.

It is further useful to give the edges, e.g., the rear and front edges of the side walls 5, 6 as well as the lateral and top edges of the front wall 7, a special shape to further reduce the possibility of air drafts entering the weighing compartment 4. This is achieved by providing one of the two walls that meet at a right angle with a groove 182 of rectangular cross-section in which the other wall is seated, as illustrated by the example shown in FIG. 2a for the edge 183 where the front wall 7 meets the side wall 6. Alternatively, an angle-profiled edge-covering piece 180 can embrace the edge of a wall over its entire length and protrude beyond the thickness of the wall to which it is attached, so that in a closed condition of the weighing compartment, the edge-covering piece 180 closes off a gap 181 that could exist between the two walls. The edge-covering piece can be made, e.g., of transparent plastic so as not to obstruct the view into the weighing compartment 4. FIG. 2b shows the same edge as FIG. 2a, but with the alternative configuration of the edge of the weighing room 4. It is self-evident that in order to tilt one of the walls 5, 6, 12 out of its respective holder, it will first have to be opened slightly to retract it from the groove or from the reach of the edge-covering piece.

FIGS. 3a–3c illustrate how the front wall 7 is released from its attachment to the floor compartment 2. Of course, the system that is used for attaching and removing the front wall 7 could also be applied for the side walls 5, 6 as well as for the top cover panel 12. As can be seen in FIG. 3c, a part of a holder element 19 is connected to the bottom edge of the front wall panel 7 (also see FIG. 1). This holder element 19 has a fork-shaped recess 50 at its bottom portion. The top of the holder element 19 has a protruding nose 49 with an indentation 47 behind it. The nose 49 is a fixed part of the holder element 19. To install the front wall 7, the fork-shaped recess 50 is seated on a rod 48 that is arranged at the wall of the floor of the floor compartment 2 (FIG. 3b). Next, the front wall 7 is pivoted counterclockwise about the rod 48 and brought into the position shown in FIG. 3a. A leaf spring 45 with a latch lever 44 and a roller 46 are arranged at the underside of the floor 8. When the front wall 7 is raised from the tilted position in FIG. 3b to the upright position of FIG. 3a, the slanted side of the nose 49 meets the roller 46 so that the latch lever 44 is pushed up far enough to let the roller 46 get over the nose 49 and snap into the indentation 47, as shown in FIG. 3a. As a result, the front wall panel 7 is held firmly in position by the engagement of the fastener parts 50, 48 and simultaneously, at a distance from the latter, by the engagement of the fastener parts 47, 46. As demonstrated through the drawings and the foregoing description, no special actuating device for tightening or releasing a clamp hold is necessary to hold the front wall panel 7 (and likewise the other panels 5, 6 and 12 of the weighing compartment 4) in place. Thus, in the sense of the foregoing discussion, the illustrated holder element 19 as well as the holder elements described below provide a firm attachment in the operating position without requiring actuation of a fastener.

The spring-clamp connection according to FIGS. 3a to 3c represents the preferred arrangement, primarily because it does not require a groove, which would be difficult to clean, and also because the attachment with the spaced-apart fastener pairs 50, 48 and 47, 46 is very stable. Nevertheless, numerous variations are conceivable and practically possible, as shown in FIGS. 4 and 5. For example, the arrangement of FIG. 4 uses a groove or channel 51 in the wall of the floor compartment 2. One or both of the vertical flanks of the channel 51 are profiled with recesses into which strip moldings 52 are inserted lengthwise. The strips 52 have lips 53 of a suitable elastic material, e.g., a polymer. The lips 53 are preferably oriented at a downward angle, as shown in FIG. 4, although they could also be arranged about horizontally. The front wall panel 7 (or, in an analogous way, one of the side wall panels 5, 6 or the top cover panel 12) has a holder element 19'. The lips 53 push against the flanks of the holder element 19' that project from the surface planes of the front wall panel 7. After the front wall panel 7 has been pushed into the channel 51, the lips 53 will snap into place behind the projecting flanks. The amount of resistance that the lips 53 will offer when the front wall panel 7 is pulled out of the channel 51 can easily be controlled in the design through the angle and dimensions of the lips which determine the amount of friction that will have to be overcome.

The channel groove 51' in FIG. 5 has a flank 54 that is inclined at an angle. After the front wall panel 7 has been set in place in the channel 51', one or more tightening rollers 55 are placed between the front wall panel 7 and the inclined flank 54, in order to push the front wall panel 7 firmly against a support surface 56. The stability of this connection depends on the height of the support surface 56 on one side and the height of the position of the roller 55 from the bottom of the channel 51'.

Although each of the aforementioned arrangements for attaching the front wall panel 7 could also be used for the side wall panels 5, 6, an arrangement as illustrated in FIGS. 6 to 9 has the advantage that the wall panel can slide by means of its respective guiding device 17 (see FIG. 1) while being clamped firmly in its working position.

FIG. 6 shows a frontal view of the balance 1, looking at the rear wall 9 of the weighing compartment. The left side wall panel 5 is shown in a released condition, while the right side wall panel 6 is in an installed condition and connected to the guiding device 17. The guiding device 17 has a guide channel 17a and a supporting surface 17b.

As shown in FIG. 7 (magnified view of detail portion VII of FIG. 6) and FIG. 8 (magnified view of detail portion VIII of FIG. 6), the guiding device 17 at the front and rear ends (in relation to the viewing direction of FIG. 6) has outward projections 17d containing cylindrical pivot pins 17c. The pivot pin 17c leaves enough room behind it so that a hook-shaped hinge part 58 can be engaged by the pivot pin 17c. The hinge part 58 is a component of a border strip 57 that is attached to the side wall panel 5. An analogous arrangement is used for the side wall panel 6. FIG. 7 shows a cross-section through the mid-portion of the border strip 57, where the latter has hook-shaped hinge parts 58 at both ends that match the locations of the aforementioned projections 17d with the pivot pins 17c. FIG. 8 illustrates a cross-section through an end portion of the border strip 57 with one of the hook-shaped hinge parts 58 engaging a pivot pin 17c.

In contrast to the design concept of FIG. 3 with two fastener pairs 50, 48 and 47, 46 at the underside of the weighing room floor 8, the holder arrangements for the side wall panels of FIGS. 6 to 9 have one of the two fastener pairs located at the top of the wall panel, either on the forward-facing side of the rear wall 9, as shown in FIG. 6, or on the rearward-facing side.

The second fastener pair (detail portion IX of FIG. 6, magnified in FIG. 9) uses a snap-closure device 125 of a special design with a frame-like snap-closure body 59, preferably an integral injection-molded polymer part. The snap-closure body 59 consists of an approximately vertical supporting portion 60 from which a tongue 61 extends in an approximately horizontal direction. The tongue 61 has a fulcrum hole 62 where the snap-closure body is rotatably supported. However, the range of rotation is limited by a bolt 64 that is mounted in the rear wall 9 and restrains the tongue 61. A spring member 63 extends out of the tongue 61, about parallel to the latter, and is tension-biased against the bolt 64. As the spring member 63 is relatively stiff, it resists a clockwise rotation of the snap-closure body 59. In addition to the tongue 61, two parallel, elastically flexing arms 68 also project horizontally from the supporting portion 60, connected at their opposite ends by a vertical leg 67. The ends of the horizontal arms 68 near the supporting portion 60 and the vertical leg 67 are thinner and longer than the flexing portion of the spring member 63 near the tongue 61, so that the pair of horizontal elastic arms 68 preferably offer a weaker spring force than the spring member 63.

The vertical leg 67 extends upwards into a post 69 with sloped top 70. The sloped top 70 cooperates with an opposing sloped surface 71 of a border piece 11 which is attached to the top of a side wall panel 5, 6 (see FIGS. 1 and 6) and which is preferably made of a transparent material. When the side wall panel 5, 6 is set in place with its hinge parts 58 on the pivot pins 17c, as shown on the left of FIG. 6 (and in the magnified detail VII in FIG. 7), and then pivoted into the upright closed position, as shown on the right of FIG. 6, the opposing sloped surface 71 glides on the sloped top 70 of the post 69 and thereby exerts a force against the snap-closure body 59. The horizontal force component acting against the body 59 is absorbed by the rear wall 9. The vertical force component causes a downward deflection of the flexible arms 68 with the vertical leg 67 and post 69 until the opposing sloped surface 71 has cleared the sloped top 70 and the post 69 snaps into the groove 72 behind the opposing sloped surface 71. This represents the engaged condition of the snap-closure device 125, as illustrated in FIG. 9.

While the snap engagement of the post 69 in the groove 72 behind the opposing sloped surface 71 requires only a relatively small effort due to the soft spring characteristic of the arms 68, a comparatively greater effort is required to disengage the snap closure. When the side wall panel 6 is pulled clockwise with respect to its hinge 17c, 58 from the vertical position shown in the right-hand part of FIG. 6, the left vertical flank of the groove 72 pushes against the post 69. As the horizontal pushing force runs eccentric to the fulcrum hole 62, it exerts a torque on the snap-closure body 59. However, because the horizontal pushing force has a short lever arm, a relatively large force will be required to cause the body 59 to rotate clockwise about the fulcrum 62, with an additional amount of resistance being contributed by the spring member 63. When the torque acting on the snap-closure body has become large enough, the snap-closure body 59 turns counterclockwise about the fulcrum hole 62 against the force of the spring 63 until the post 69, which is constrained to a translatory movement, has left the groove 72 and the side wall panel 5, 6 is thereby released. An abutment surface 65 of the snap-closure body 59 above the fulcrum hole 62 rests against the upper edge of the rear wall 9 and thereby reduces the tendency of the spring member 63 to overshoot in the opposite direction after the release of the side wall. Of course, one could use any other force-generating device instead of the spring 63, e.g., a magnetic element. However, the arrangement with the spring member 63 is preferred because its integration into the snap-closure body, particularly in an injection-molding process, offers a cost advantage in production.

The advantages of this arrangement are that it requires less effort for putting a wall panel back in place than it takes for releasing it, and that the movement of the side wall 5, 6 by means of the guiding device 17 is securely guided by the engagement of the post 69 in the groove 72. It is self-evident that the references to "right", "left", "top", "bottom" are meant in a relative sense. For example, the two snap-closure bodies 59 in FIG. 6 are mirror-symmetric so that left and right are switched from one to the other. It also goes without saying that a snap-closure body 59 could be assembled from a plurality of components, although the concept of an integral injection-molded part is favored from a manufacturing point of view. One could also do without the parallel-guiding arrangement of the leg 67 by means of the two flexing arms 68 and use a single flexure arm instead, in which case the post 69 would, however, need more horizontal clearance in the groove 72 so that the movement of the post 69 in the groove 72 would not be guided with the same precision. Further possibilities are to connect the post at any other location on the leg 67 or a flexure arm 68, or to have one or more posts connected to the sliding wall panel and a groove on a stationary part, so that the relationship between the parts 69 and 72 would be reversed.

FIG. 10 illustrates a balance 1 as seen in the direction of the arrow II of FIG. 1, with the housing 3 partially removed and the weighing compartment 4 closed. The side walls 5, 6 as well as the top cover panel 12 can be moved individually or together, either manually or in a motorized mode, preferably with a single motor 28, so that either or both sides and/or the top of the weighing compartment can be opened and closed as desired in a given situation. FIG. 10 illustrates in particular the drive mechanism for moving the panels 5, 6 and 12, which extends on the three levels 25, 26, 27 and a further level 36. The drive-mechanism shown in this example is a cord-pulley drive (described in detail in the context of FIG. 15). An upper cord-pulley drive on the level 26 (not visible) serves to move the top cover panel, and a lower cord-pulley drive on the level 36 (likewise not visible) serves to move the side walls 5, 6.

FIG. 10 further shows the guiding mechanism for the top cover panel 12. The carrying handle 13 simultaneously serves as a guide rail for the guide element 14 of the holder 15 of the top cover panel 12, which runs along the carrying handle 13. The handle 13 is connected to the level 26 though a connector brace 34. Two holding members 32 for the housing 3 (removed in FIG. 10) are arranged between the connector brace 34 and the rear wall 9. A lower portion 33 of the guide element 14 is arranged below the holding members 32 and joined through a narrow connector 41 to the holder 15 of the top cover panel 12 (The design details are illustrated in FIG. 13).

Figure 14:
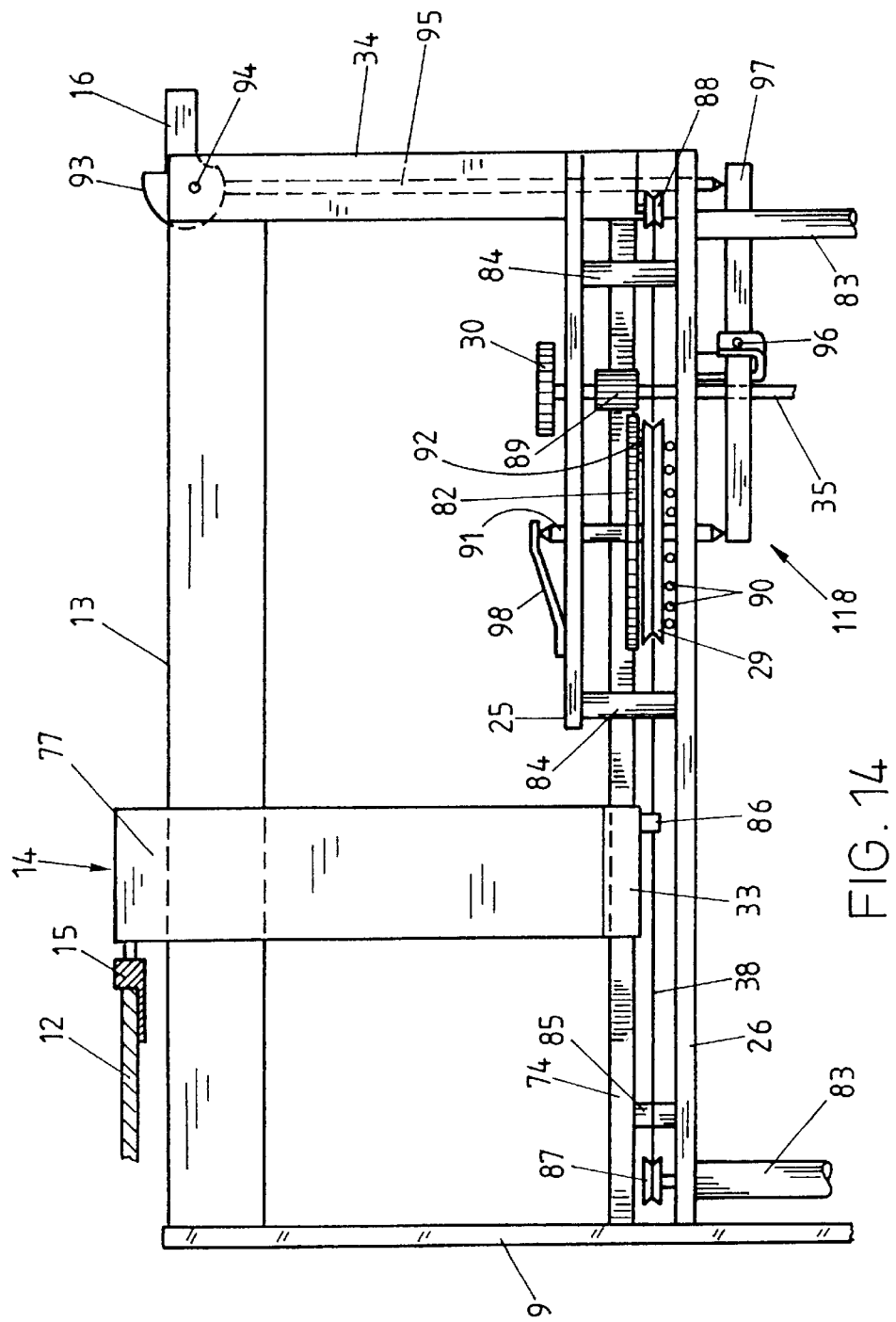
FIG. 14 represents a side view of the drive mechanism of the top cover panel.

The cord-coupling lever 16, serves to couple and uncouple the top cover panel 12 with the upper cord-pulley drive 38 (see FIG. 14)

Figure 11:
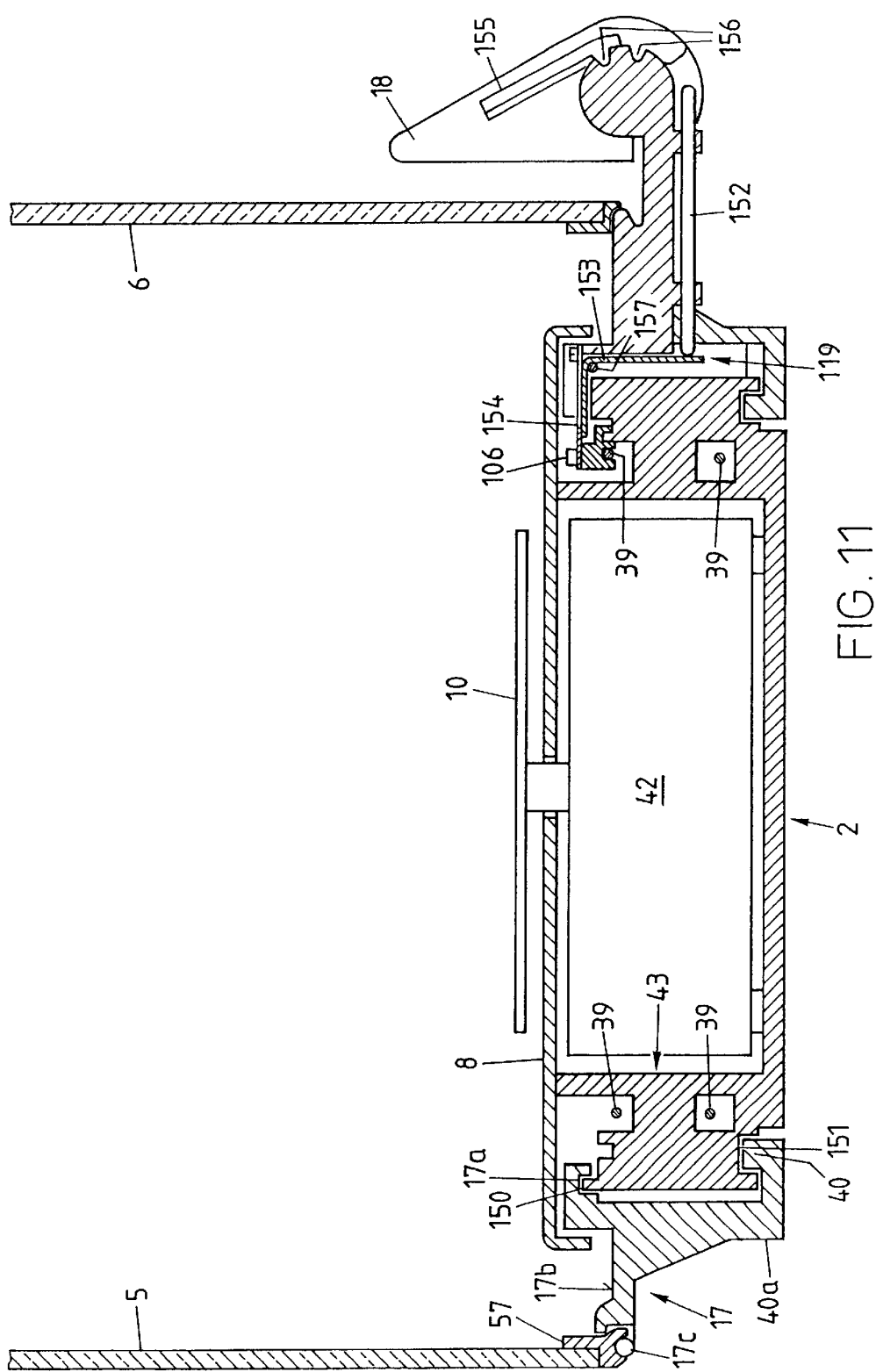
FIG. 11 shows a sectional view of the lower portion of the balance as seen from the front.

FIG. 11 shows a sectional view of the floor compartment 2 of the balance 1. The reference symbol 42 stands for the operative weighing portion of the balance, to which the weighing pan 10 is connected in a known manner. As mentioned above, the operative weighing portion 42 can also be arranged in the housing 3 in a different configuration of the balance, and the weighing pan can be coupled to it by means of an L-shaped support.

On either side of the operative weighing portion 42, a guide element 43 extends over the entire length of the balance 1 as a stationary component connected to the floor compartment 2. At its upper outside edge, the guide element 43 has a rectangular projection 150 that is engaged in the guide channel 17a of the guiding device 17 (illustrated in the left-hand portion of FIG. 11).

Another guide channel 151 which, however, extends over only a part of the length of the guide element 43, is arranged at the bottom of the guide element 43. The channel 151 is engaged by a guide bolt 40 which is connected to the guiding device 17 by means of a bolt bracket 40a. The position of the guide bolt 40 and the position and length of the guide channel 151 in relation to each other are coordinated so as to form end stops for the travel of the bolt 40 in the guide channel 151. Other recesses and hollow spaces of the guide element 43 are provided for the cord of the lower cord-pulley drive 39 that serves to move the side walls 5 and 6.

The guiding devices 17 of the side walls 5, 6 can be coupled to or uncoupled from the cord-pulley drive 39 through detent-locking side-wall couplers 119 (shown in the right-hand portion of FIG. 11, and also in FIG. 12) that are operated by means of coupling actuators 18. The lever 18 has two detent positions 156 for a spring element 155. The side wall is coupled to the cord-pulley drive when the lever 18 is in the upright position. When the lever 18 is pushed into the inclined position, the spring element 155 engages the lower of the detents 156 and pushes the rod 152 against the angled lever element 153 and causes the latter to tilt about the pivot axle 157 and lift the coupler spring 154 out of the traveling coupler element 106. This is illustrated in detail in FIGS. 12a to 12d, where FIG. 12a shows the traveling coupler element 106 in a perspective view; FIG. 12b shows the coupler element with the angled lever element 153 and the coupler spring 154 in a top view; and FIGS. 12c and 12d show a side view of the coupling arrangement in the engaged position (FIG. 12c) and the disengaged position (FIG. 12d).

The traveling coupler element 106, which is fixedly connected to the cord-pulley drive 39 and holds the cord in a groove 158, has ramps 107 and 107' rising from the ends towards the center of the coupler element. When the coupling lever 18 is in the engaged position and the traveling coupler element 106 happens to be at a different location along its travel range, the traveling coupler element 106 will during a movement of the cord-pulley drive automatically connect with the coupler spring as the tongue 159 of the coupler spring 154 will first be pushed up by one of the ramps 107 or 107' and then snap into the notch 108 between the ramps. Having been coupled to the cord-pulley drive, the respective side wall 107, 107' is automatically moved to the desired position. In their uncoupled condition, the side walls 5, 6 can also be moved manually. The coupler element 106 has a groove channel 141 that runs along a guide rail of the guiding device 17.

The sectional view of FIG. 13 illustrates the guiding device 120 of the top cover panel 12 (the latter not being shown in FIG. 13). The body 78 of the guide element 14 has laterally projecting ridges 79, to which the plates 77 are attached by screws 80. The top portions of plates 77 (broken off in FIG. 13) are connected to the holder arrangement 15 (likewise not shown) for the top cover panel 12. The upper portion of the body 78 is surrounded by the carrying handle 13. Inside the carrying handle and to the left of the middle is an upper gear rack 73 which is engaged by an upper gear 73a. A similar arrangement is used with the lower gear rack 74 and the lower gear 74a in the bottom portion 33 of the guide element 14. The gears 73a and 74a are connected by a vertical shaft 66. To prevent any loose play from side to side, there are pairs of guide rollers 75 and 76 arranged next to the upper gear 73a and the lower gear 74a, respectively, so that the guide element 14 will always run straight and in correct alignment along the carrier handle 13. The vertical force on the guide element 14 is taken up by a glide element 124. However, the guide element 14 could also run on one or more rollers. The underside of the bottom portion 33 of the guide element 14 is coupled to the upper cord-pulley drive 38 by means of an arrangement that is shown in FIG. 16. The body 78 is moved along the gear racks 73 and 74 by means of the cord-pulley drive 38. The narrow connector portion 41 of the body 78 runs in a slot 81 between the border members 32 of the housing 3 (also see FIG. 10). The slot 81 can be sealed against dust by overlapping lamellae, sealing lips or brushes.

FIG. 14 shows a side view of the drive mechanism for the top cover panel 12, complementing FIGS. 10 and 13. The area of the drive source is arranged on two levels 25 and 26, as in FIG. 10, but without showing the motor 28 in the drawing. A coupling lever 16 is arranged at the rearward end of the carrying handle 13, controlling a clutch 118 (not shown) that couples and uncouples a connection between the gear 82 and the pulley 29, so that the top cover panel can be selectively coupled to or uncoupled from the motor 28. The motor 28 can be a reversible motor, or a reversing gearbox can be provided to allow the cord-pulley drive to run forward and backward. A gearbox could be either manually reversible or actuators could be provided that work like electrical limit switches to reverse direction when the guide element 14 reaches an end position. The drive power is transmitted from the motor 28 by way of a spur belt to the gear 30 which, in turn, drives the gear 82 through the pinion 89.

As may be seen in the drawing, the level 26 is formed by a horizontal plate resting on tall columns 83, and the level 25 is formed by a smaller plate supported on the level 26 by short columns 84. The lower gear rack 74, shown schematically in the drawing, can likewise be supported by the level 26 through columns 85 (only one of which is visible in the drawing). The lower gear rack 75, the upper gear rack 73 (arranged inside the carrier handle 13, as shown in FIG. 13), the connector brace 34, and the rear wall 9 together constitute a rigid frame that hold the slidable top cover panel 12 in precise alignment. The top cover panel 12 is attached to the holder 15 which, in turn, is connected by way of the plates 77 to the body 78 (not visible in the drawing) of the guide element 14 as described above in the context of FIG. 10. The lower portion 33 of the guide element 14 is guided along the lower gear rack 74. A pin-like connector element 86 protrudes from the underside of the guide element 14 and serves to connect the guide element 14 to the upper cord-pulley drive 38. The cord is guided by the pulleys 29, 87 and 88 and is looped around the driving pulley 29 in a known manner. The driving pulley 29 can run, e.g., on a ball bearing 90.

The gear 30 that is driven by the motor 28 by way of a spur belt (see FIG. 10) is connected through the shaft 35 to the pinion gear 89 (shown in FIG. 14). The shaft 35 is configured in such a way that it can be inserted and removed in a simple manner from above for assembly and disassembly. The pinion gear 89 meshes with a gear 82 on a shaft 91 whose position can be raised and lowered. By changing the vertical position of the shaft 91 together with the gear 82, the latter is coupled and uncoupled from the pulley 29. The clutch between the gear 82 and the pulley 29 can be designed in a variety of known configurations, but an arrangement of ramps 92 with a locking spring element analogous to the concept of FIG. 12 is preferred. As the clutch is located in the narrow space between the pulley 29 and the gear 89, the positioning detent for the clutch spring is formed by two bolts with sloped upper end surfaces.

The top panel clutch 118 is operated by the clutch lever 16 that was already mentioned in the context of FIG. 10. By means of the lever 16, the operator can selectively disengage the pulley 29 from the motorized drive 28, 82 in order to be able to manually move the top cover panel 12, or to move the side walls 5, 6 alone without moving the top cover panel. The clutch lever 16 is connected to a cam disk 93 that rotates together with the lever 16 on an axle 94 that is held by the connector brace 34. A push rod 95 is guided for vertical movement inside the connector brace 34. The two-armed lever 97 pushes the rod 95 upward against the cam 93.

The other end of the two-armed lever 97 bears against the bottom end of the shaft 91 on which the gear 82 is mounted. A spring 98 that is attached to the level 25 bears against the top end of the shaft 91 and urges the latter downward against one arm of the lever 97. This causes the lever arm on the other side of the fulcrum 96 to push the rod upwards against the cam 93. Thus, when the clutch lever 16 is moved counterclockwise, the cam 93 pushes the rod 95 downward against the force of the spring 98 and tips the two-armed lever 97 in the clockwise direction. This causes the other lever arm to raise the shaft 91 with the gear 82 and thereby disengage the clutch between the gear 82 and the pulley 29. In the disengaged position, the gear 82 stays in mesh with the pinion 89. The manual actuation of the clutch could, of course, be replaced by an automatic actuation, e.g., through an electromagnetic actuating member.

Figure 15:
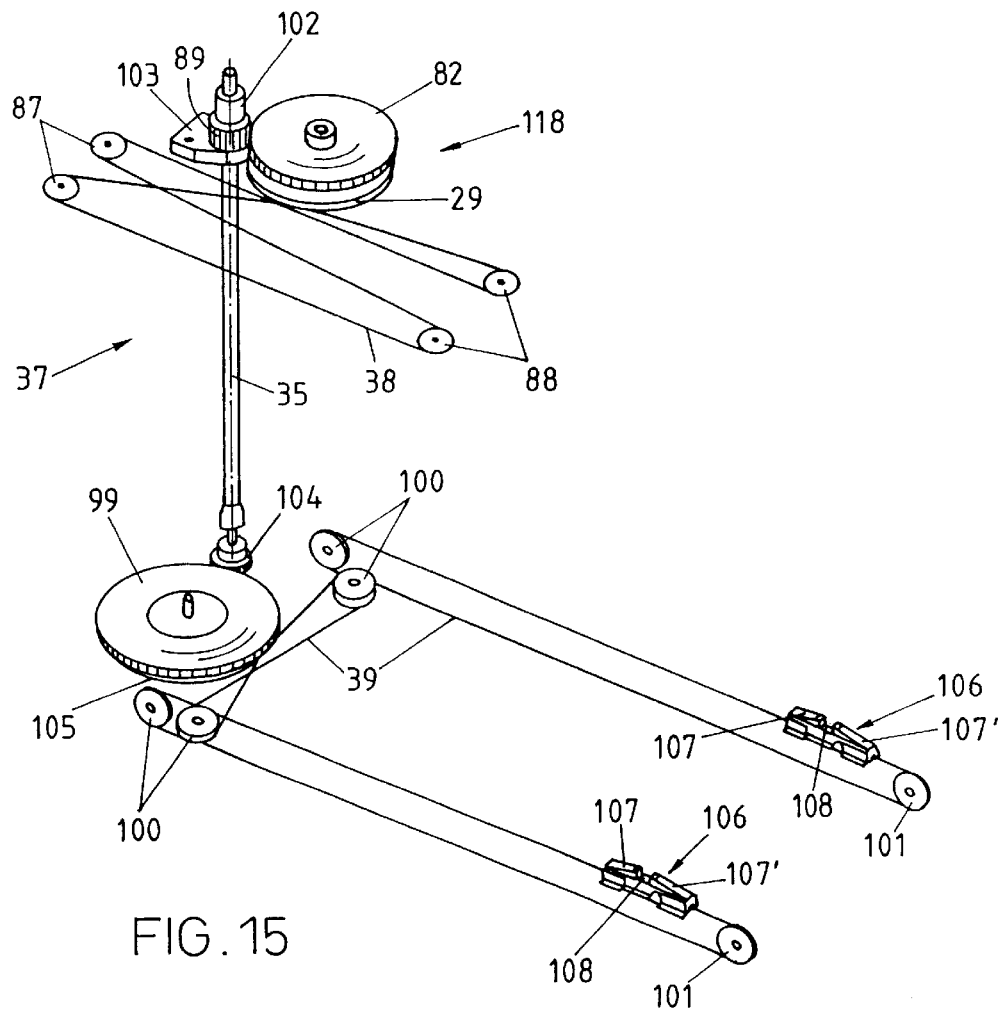
FIG. 15 gives a schematic representation of the entire drive mechanism.

FIG. 15 illustrates the overall drive mechanism with an upper cord-pulley drive 38 and a lower cord-pulley drive 39, without showing the motor 28 and the gear 30 for the spur belt (see FIG. 10). The gear 89 is connected to the drive shaft 35 that runs in bearings 102, 103 and transmits the driving movement to the lower cord-pulley drive 39. The cord of the upper drive 38 is looped in a full circle around the driving pulley 29, then runs around the pulleys 87, 88, and returns to the driving pulley 29, as shown in the drawing. The straight runs of the cord between the pulleys 87 and 88 are connected to the bottom portion of the guide element 14 of the guiding device for the top cover panel (see FIG. 14). The connection is made by means of a fastener element 86 at a suitable location. A preferred design of the fastener element 86 is illustrated in FIG. 16 and will be described below.

A pinion gear 104 at the bottom end of the shaft 35 drives the lower cord-pulley drive 39 by way of the gear 99, which is in fixed connection with the pulley 105. Analogous to the upper cord-pulley drive 38, the cord of the cord-pulley drive 39 is looped in a full circle around the driving pulley 105, then runs around the pulleys 100, 101 and returns to the driving pulley 105, as shown in the drawing. The upper straight runs of the cord between the pulleys 100 and 101 are connected to the traveling coupler elements 106 for moving the side walls 5, 6 (also see FIG. 12a–12d).

Figure 16A:
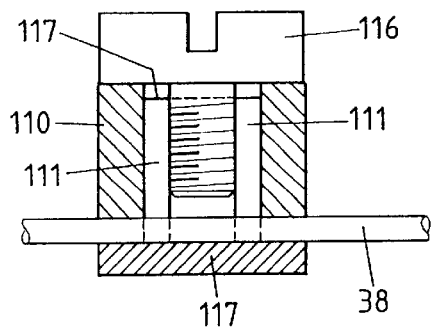
FIGS. 16a and 16b illustrate a concept for fastening the cord as seen from the side (FIG. 16a) and from the front (FIG. 16b)
Figure 16B:
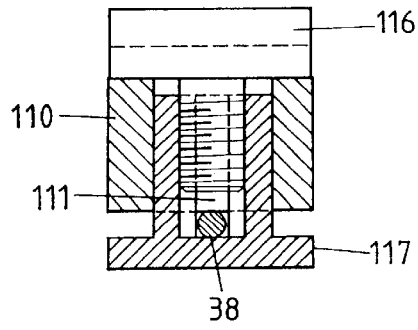

As previously mentioned, FIG. 16 illustrates a possible way of attaching the cord, as seen from the side in FIG. 16a and from the front in FIG. 16b. The attachment device consists of a body 117 with a slot 111 to receive the cord 38. The upper portion of the body 117 contains an internal thread. A sleeve 110 is set over the body 117 and a screw 116 is turned far enough into the thread so that the sleeve clamps down on the cord.

As mentioned previously, the side walls 5, 6 and the top cover panel 12 are slidable by means of a single motor 28. It is conceivable that in some configurations of a balance, the walls 5, 6, 12 may have different lengths of travel between their respective open and closed positions. For example, the top cover panel 12 could move a longer or shorter distance than the side walls 5, 6. The configuration of the drive system with cord-pulley drives 38, 39 as well as the connection to the motor through a plurality of gears provides the design flexibility to easily adapt the respective transmission ratios so that the walls 5, 6 and the top cover panel 12 will move synchronously when they are coupled to the drive.

It can further be of advantage if the drive mechanism is designed to recognize a desired direction of movement of the side walls 5, 6 and top cover panel 12 when the operator manually pushes in the desired direction against a suitable place on the respective side wall 5, 6 or top cover panel 12. For example, if the clutch actuators 18, 16 are pushed or pulled while they are in their engaged condition, the direction of movement could be detected by a sensor, and the motor could be activated to run in the desired direction. It is further conceivable that the walls 5, 6 and top cover panel 12 are set in motion by pushing them with a force that exceeds a threshold force, analogous to the way a CD-ROM drawer closes in response to a pushing force.

As illustrated already in FIG. 1, the rear wall 9 of the weighing compartment is wider as well as taller than the housing 3. This makes it possible to provide cutout openings 20 in the rear wall (see FIG. 1) that can be arranged on the sides as well as on top. The cutout openings 20 can be closed by means of interchangeable clip-on covers 21. For example, the clip-on covers could be removed from one or more of the cutout openings 20 in order to provide passages for supply lines such as electrical cables and/or hoses for liquids that are to be weighed. In this way, experiments can be performed inside the weighing compartment while simultaneously observing weight changes without having to open the weighing compartment and thereby running the risk of causing weighing errors. Of course, cutout openings 20 could conceivably be provided also in the side walls 5 or 6 and/or in the top cover panel 12.

Figure 17:
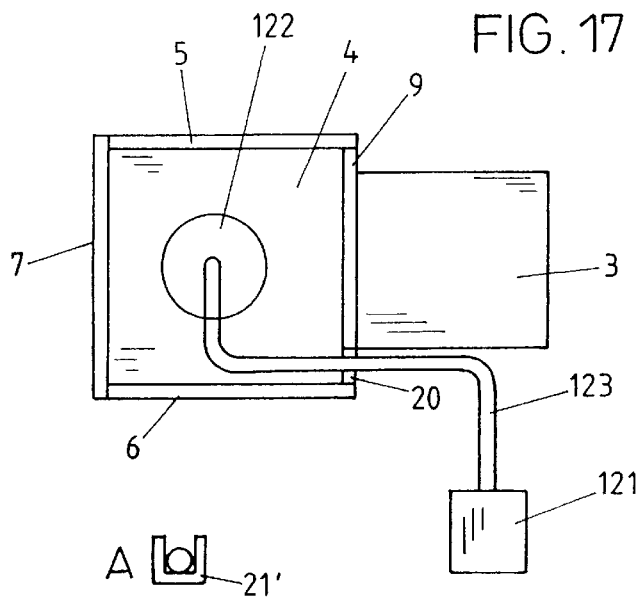
FIG. 17 shows a possible use for the openings in the rear wall, as seen from the top.

FIG. 17 illustrates a possible use for the cutout openings 20 in the rear wall 9 as seen from the top. While the cutout openings are usually closed off by clip-on covers to keep out air drafts, the clip-on covers can be removed so that the openings can be used as passages for conduits, hoses, etc. FIG. 17 shows an example where a liquid is dispensed from the container 121 through the conduit 123 by way of the cutout opening 20 to the container 122 for weighing. Instead of leaving the cutout 20 entirely open, it is advantageous to use a special U-shaped clip-on device 21' (see detail A) to better hold the conduit in place.

Figure 18:
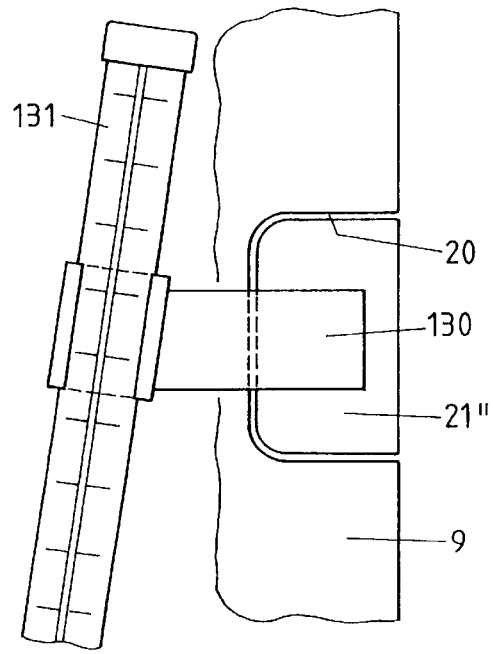
FIG. 18 shows a possible use for the clip-on devices, as seen from the front.

As a further use for clip-on devices inserted into the cutout openings 20, FIG. 18 shows an example of a clip-on device 21" with an equipment holder 130 that extends into the interior of the weighing compartment 4. Equipment holders 130 that are installed in this manner can be used for the flexible and removable arrangement of conduits, hoses, a thermometer 131 and/or all kinds of tools that are needed for experimenting inside the weighing compartment 4.

Figure 19:
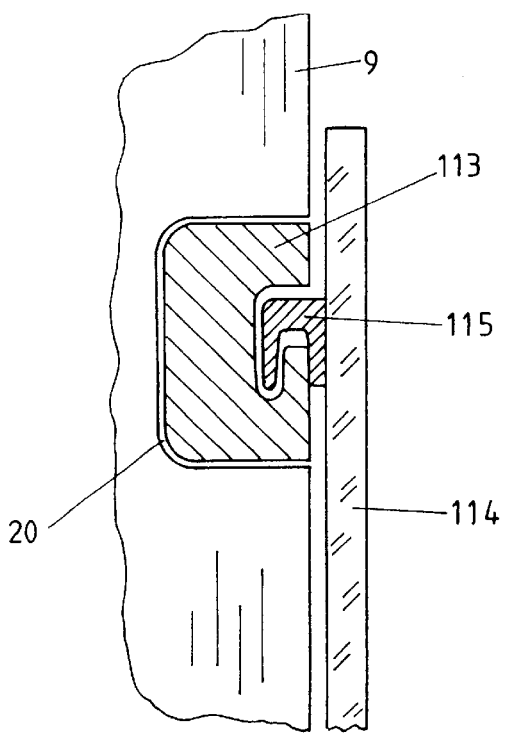
FIG. 19 shows a possible use of the clip-on devices for an embodiment of the balance with wall panels of reduced height, in a sectional view.

A further application for the cutout openings is shown in FIG. 19. It is conceivable to use versions or configurations of the balance where the side walls 114 are of a different height. In order to move the different side wall panels 114 with the drive mechanism according to the invention, a guide needs to be provided in the upper portion of the wall panel 114. This can be accomplished by using suitable clip-on devices 113 that are inserted into the cutout openings 20. Connected to the wall panels 114 are holder rails 115 that are slidably guided by the clip-on devices 113. Of course, removing the panels 114 from the balance is an equally simple procedure as described above for the wall panels 5, 6.

Figure 20:
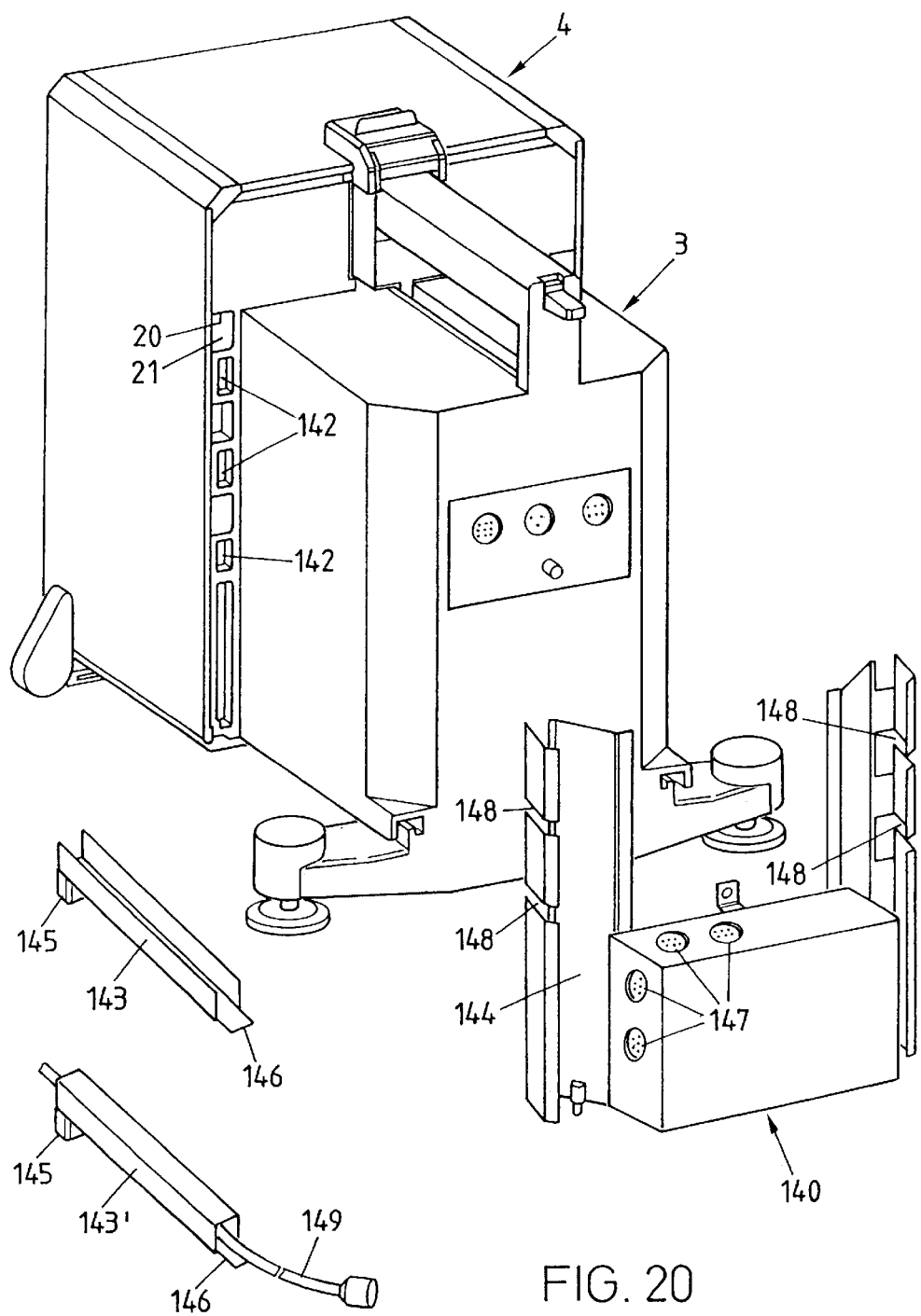
FIG. 20 shows a balance seen at an oblique angle from the rear with accessory unit, holder device and guide channels, in a three-dimensional representation.

As shown in FIG. 20, an accessory unit 140 can be releasably attached to the rear of the balance with a simple fastener, e.g., a screw with a knurled head. The accessory unit 140 can contain power-supply units such as a battery, or an electronic control module. The accessory unit 140 has openings 147 for different kinds of connectors. This allows experimental setups, e.g., dispensing devices, in the weighing compartment 4 to be electrically connected to the accessory unit 140. The cables and conduits enter the weighing compartment 4 through the cutout openings 20, which are equipped with special clip-on holders comparable to the clip-on device 21'. To prevent the electrical cables and/or conduits, such as the conduit 123 in FIG. 17, from interfering with the movement of the side walls 5, 6 as the latter slide back along the housing 3, the rear wall 9 has recesses 142 for the attachment of guide channels 143 on both sides of the housing 3. The guide channels are further held in place by slots 148 of a holder device 144 of the accessory unit 140. The guide channels 143 can for example be made of metal or of a polymer material. As illustrated in FIG. 20, the guide channels can be designed in different ways; for example, the guide channel 143' is covered on top, so that it has the shape of a tube. It is also conceivable to design the guide channels as side-mounted modules attached to the housing 3 and extending over one or more of the cutout openings 20. A further possibility is to arrange a simple electronic module or part of a module in the guide channels, particularly in an embodiment without the accessory unit 140.

The guide channels 143 can be no wider that is compatible with the free movement of the side walls 5, 6. The ends of the guide channels 143 are configured as connectors 145, 146 to attach the guide channels to the rear wall and to the holder device 144, respectively. The advantage of this concept is that the weighing compartment 4 can be kept closed to the outside, while experimental setups inside the weighing compartment 4 of the kind that are described in detail, e.g., in the aforementioned patent application CH-1957/00 can still be supplied and operated.

Of course, the housing 3, which is in essence occupied by the drive mechanism, and the accessory unit 140 could be combined in a common housing. The guide channels 143 for conduits and cables could be integrated in the side walls of the common housing and they could also be closed to the outside with special covers.

| LIST OF REFERENCE SYMBOLS | |
|---|---|
| 1 | balance |
| 2 | floor compartment |
| 3 | housing |
| 4 | weighing compartment |
| 5 | side wall panel |
| 6 | side wall panel |
| 7 | front wall panel |
| 8 | floor |
| 9 | rear wall |
| 10 | weighing pan |
| 11 | border piece |
| 12 | top cover panel |
| 13 | carrying handle |
| 14 | guide element |
| 15 | holder element for top cover panel |
| 16 | coupler lever |
| 17 | guiding device |
| 17a | guide groove |
| 17b | support surface |
| 17c | pivot pin |
| 17d | projection |
| 18 | clutch actuator |

-continued

LIST OF REFERENCE SYMBOLS

| | |
|---|---|
| 19, 19' | holder for front wall panel |
| 20 | cutout passages |
| 21, 21', 21" | clip-on devices |
| 22 | feet |
| 23, 24 | slanted corner sections |
| 25, 26, 27 | levels |
| 28 | motor |
| 29 | pulley |
| 30 | spur-belt gear |
| 32 | holding member |
| 33 | bottom portion |
| 34 | connector brace |
| 35 | rotary shaft |
| 36 | level |
| 38 | upper cord-pulley drive |
| 39 | lower cord-pulley drive |
| 40 | guide bolt |
| 40a | bolt bracket |
| 41 | connector portion |
| 42 | operative weighing portion |
| 43 | guide element |
| 44 | latch lever |
| 45 | leaf spring |
| 46 | roller |
| 47 | indentation |
| 48 | rod |
| 49 | nose |
| 50 | fork-shaped recess |
| 51, 51' | channel |
| 52 | strip molding |
| 53 | lip |
| 54 | inclined flank |
| 55 | roller |
| 56 | support surface |
| 57 | border strip |
| 58 | hinge part |
| 59 | snap-closure body |
| 60 | supporting portion |
| 61 | tongue |
| 62 | fulcrum hole |
| 63 | spring member |
| 64 | bolt |
| 65 | abutment surface |
| 66 | vertical gear shaft |
| 67 | vertical leg |
| 68 | flexible arm |
| 69 | post |
| 70 | sloped top |
| 71 | opposing sloped surface |
| 72 | groove |
| 73 | upper gear rack |
| 73a | upper gear |
| 74 | lower gear rack |
| 74a | lower gear |
| 75 | upper guide rollers |
| 76 | lower guide rollers |
| 77 | plates |
| 78 | body of guide element |
| 79 | ridges |
| 80 | screws |
| 81 | slot |
| 82 | gear |
| 83 | tall columns |
| 84 | short columns |
| 85 | columns |
| 86 | fastener element |
| 87 | pulley |
| 88 | pulley |
| 89 | pinion gear |
| 90 | ball bearing |
| 91 | shaft |
| 92 | ramp arrangement |
| 93 | cam disk |
| 94 | axle |
| 95 | push rod |
| 96 | fulcrum |
| 97 | two-armed lever |

-continued

LIST OF REFERENCE SYMBOLS

| | |
|---|---|
| 98 | spring |
| 99 | gear |
| 100 | pulley |
| 101 | pulley |
| 102 | bearing |
| 103 | bearing |
| 105 | pulley |
| 106 | traveling coupler element |
| 107, 107' | ramps |
| 108 | notch |
| 110 | sleeve |
| 111 | slot |
| 113 | clip-on device |
| 114 | side wall panel |
| 115 | holder rail |
| 116 | screw |
| 117 | body of attachment device |
| 118 | clutch for top cover panel |
| 119 | side wall coupler |
| 120 | guiding device |
| 121 | container |
| 122 | weighing container |
| 123 | conduit |
| 124 | glide element |
| 125 | snap-closure device |
| 130 | equipment holder |
| 131 | thermometer |
| 140 | accessory unit |
| 141 | groove channel |
| 142 | recesses |
| 143, 143' | guide channels |
| 144 | holder device |
| 145 | connector |
| 146 | connector |
| 147 | openings in the accessory unit |
| 148 | slots |
| 150 | projection |
| 151 | guide channel |
| 152 | rod |
| 153 | angled lever element |
| 154 | coupler spring |
| 155 | spring element |
| 156 | detent positions |
| 157 | pivot axle |
| 158 | groove |
| 159 | tongue |
| 180 | edge-covering piece |
| 181 | gap |
| 182 | groove |
| 183 | edge |

What is claimed is:

1. A balance (1) comprising a weighing compartment (4) that borders on a stationary part (8, 9) of the balance and is otherwise enclosed by at least one side wall panel (5, 6), a front wall panel (7), and a top cover panel (12); wherein at least one of said panels is slidable by means of a guiding device (17, 120) to open and close the weighing compartment (4), and wherein at least one of said panels is a non-slidable wall panel; wherein further a holder arrangement (15, 17c, 58, 125) for the at least one slidable panel (5, 6, 12) is integrated in the guiding device (17, 120), and a holder arrangement (19) for the non-slidable wall panel is integrated in the stationary part (8), wherein said holder arrangements (15, 19, 17c, 58, 125) releasably connect the panels (5, 6, 7, 12) individually to the balance by means of form-locking closure devices for each panel, so that each panel (5, 6, 7, 12) can be individually attached to the balance as well as individually released for removal from the balance by applying a force to at least one of said panel (5, 6, 7, 12) and said holder arrangement(15, 19, 17c, 58, 125).

2. The balance of claim 1, wherein the front wall panel (7) is non-slidable, the side-wall panels (5, 6) and the top-cover panel (12) are slidable, and each of the panels (5, 6, 7, 12) can be individually attached as well as individually released by hand.

3. The balance of claim 1, wherein at least one of the holder arrangements comprises at least one snap-closure body (59).

4. The balance of claim 3, wherein the stationary part (8, 9) comprises a rear wall (9), and wherein the at least one snap-closure body (59) is arranged on said rear-wall (9) and serves to attach and release said at least one slidable sidewall panel (5, 6).

5. The balance of claim 3, wherein the at least one snap-closure body (59) comprises a vertical supporting portion (60), a tongue (61) protruding substantially horizontally from the vertical supporting portion (60) and containing a fulcrum hole (62) on which the snap-closure body (59) is rotatable, a spring member (63), and two parallel elastically flexible arms (68) connected by a leg (67), and wherein the spring member (63) is elastically biased against a bolt (64) of the rear wall (9).

6. The balance of claim 3, wherein the snap-closure body (59) is manufactured as a single integral piece of polymer material.

7. The balance of claim 4 wherein the at least one side wall panel (5, 6) is released from the snap-closure body (59) manually by pulling said side wall (5, 6) outwards in a tilting movement.

8. The balance of claim 7, wherein the at least one side wall panel (5, 6) is connected to the snap-closure body (59) by pushing said side wall (5, 6) inwards and wherein the releasing the side wall panel (5, 6) from the snap-closure body takes a greater amount of force than connecting the side wall panel to the snap closure body.

9. The balance of claim 1, wherein the weighing compartment (4) has joints where any two of the panels (5, 6, 7, 12) meet each other and where the side wall panels (6, 7) and top cover panel (12) meet the rear wall (9), and wherein at least one of said joints is formed by an edge of one being seated in a groove of the other of said panels and rear wall, in order to stop air drafts.

10. The balance of claim 1, wherein the weighing compartment (4) has joints where any two of the panels (5, 6, 7, 12) meet each other and where the side wall panels (6, 7) and top cover panel (12) meet the rear wall (9), and wherein at least one of said joints is formed by an edge-cover strip attached to the edge of one and reaching around an edge of the other of said panels and rear wall, in order to stop air drafts.

11. The balance of claim 1, further comprising drive means (38, 39) for moving the at least one slidable panel (5, 6, 12).

12. The balance of claim 11, wherein the drive means comprise cord-pulley drives.

13. The balance of claim 12, wherein the cord-pulley drives comprise a first cord-pulley drive (38) arranged in an upper area of the balance and a second cord-pulley drive (39) in a lower area of the balance, and wherein the cord-pulley drives (38, 39) are coupled to each other by a common rotary shaft (35).

14. The balance of claim 11, further comprising coupler devices (118, 119) by which the at least one slidable panel (5, 6, 12) can be coupled to and uncoupled from the drive means (38, 39).

15. The balance of claim 14, further comprising coupler levers (16, 18) for manually actuating the coupler devices (118, 119).

16. The balance of claim 14, wherein the couplers (119) comprise traveling coupler elements (106) that automatically position themselves for engagement.

17. The balance of claim 16, wherein the traveling coupler elements (106) have ramps (107, 107') rising towards each other and separated by a notch (108), and wherein the balance comprises a coupler spring (154) connected to the at least one slidable panel (5, 6) and arranged so that the movement of the traveling coupler element (106) causes the coupler spring to slide up the ramp (107, 107') and snap into the notch (108), thereby coupling the slidable panel (5, 6) to the second cord-pulley drive (39).

18. The balance of claim 11, wherein the side wall panels (5, 6) and the top-cover panel (12) are slidable, wherein the side wall panels (5, 6) have travel distances between their open an closed positions different from the top-cover panel (12), and wherein the drive means (38, 39) have transmission ratios adapted to said different travel distances, so that the drive means (38, 39) move synchronously.

19. The balance of claim 11, wherein the drive means (38, 39) are powered by a single motor (28).

20. The balance of claim 11, wherein more than one panel is slidable and wherein the slidable panels can be selectively driven and the selection is between the modes of driving an individual panel, all panels together, as well as any subcombination of panels.

21. The balance of claim 14, wherein a panel (5, 6, 12) that is coupled to the drive means (38, 39) is set in motion in a desired direction by pushing manually in the desired direction of movement against any portion of said panel (5, 6, 12).

22. The balance of claim 1, further comprising a carrying handle (13).

23. The balance of claim 22, wherein the carrying handle is configured as a rail for a guide element (14) of a guiding device (120) of the top cover panel (12).

24. The balance of claim 23, wherein the guide element (14) comprises a vertical body (78) holding a vertical gear shaft (66) with an upper gear (73a) and a lower gear (74a) and the guiding device comprises a pair of gear racks (73, 74) meshing with the gears (73a, 74a).

25. The balance of claim 23, wherein the guide element (14) is laterally constrained in the guiding device by one of a gliding constraint and a rolling constraint, the latter constraint comprising guide rollers (75, 76).

26. The balance of claim 1, wherein at least one of the side-wall panels (5, 6), front-wall panel (7), top-cover panel (12) and rear wall 9 comprises cutout passages (20) for cables and conduits (123).

27. The balance of claim 26, wherein the cutout passages (20) can be closed by means of clip-on covers (21, 21', 21", 113).

28. The balance of claim 27, wherein the cutout passages (20) are provided with clip-on devices (21") with equipment holders (130) for tools.

29. The balance of claim 27, comprising side wall panels (114) of different height, wherein the cutout passages (20) are provided with clip-on devices (113) that cooperate with holder rails 115 as part of the guiding device for the slidable side wall panels (114) of different height.

30. The balance of claim 1, comprising an accessory unit (140) containing modules from the group of electric power supplies and control electronics.

31. The balance of claim 30, wherein the stationary part of the balances comprises a housing (3) and the accessory unit (140) is integrated in the housing (3).

32. The balance of claim 30, wherein the accessory unit (140) comprises passages (147) for cables and conduits (123).

33. The balance of claim 32, wherein the accessory unit (140) is connected to the rear wall (9) through guide channels (143, 143') for the conduits and cables (123).

34. The balance of claim 33, wherein the guide channels (143, 143') are integrated in the housing (3) and can be closed to the outside by means of covers.

* * * * *